Oct. 15, 1940.  A. MUSHER  2,217,700
FROZEN CONFECTION AND METHOD FOR MAKING IT
Filed July 1, 1939
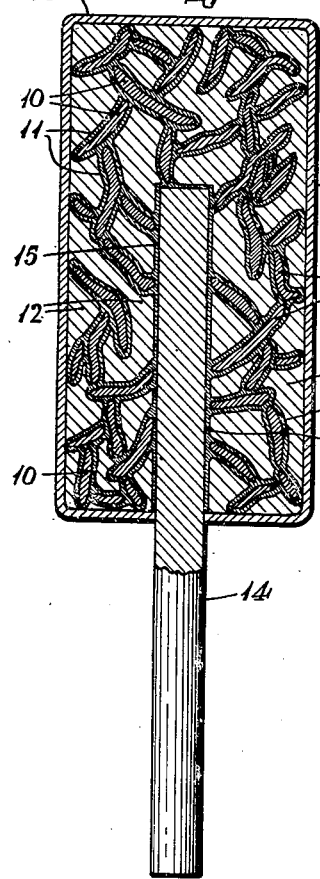
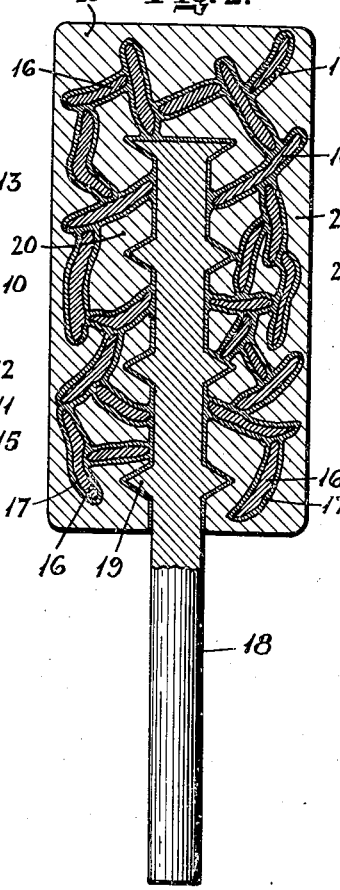
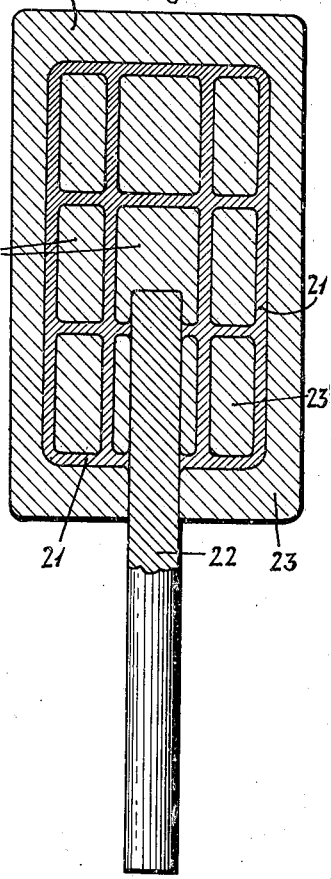
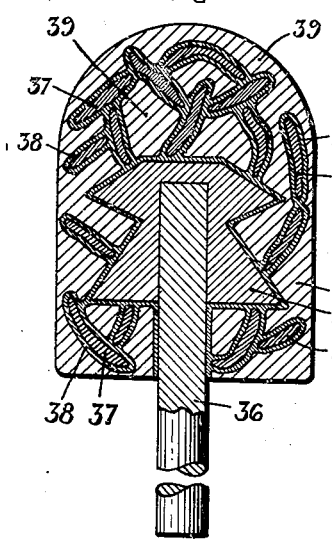
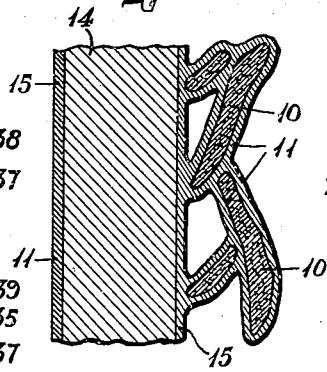
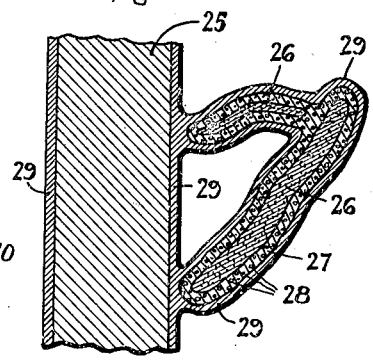
INVENTOR.

Patented Oct. 15, 1940

2,217,700

UNITED STATES PATENT OFFICE 2,217,700

FROZEN CONFECTION AND METHOD FOR MAKING IT

Albert Musher, New York, N. Y., assignor to Musher Corporation, Elizabeth, N. J.

Application July 1, 1939, Serial No. 282,342

14 Claims. (Cl. 99—137)

This invention relates to a new confection, and to methods for producing it.

The object of the present invention is to provide a new confection product that they may be merchandised, sold, and consumed in the form of bricks or in other forms, or that they may be placed on a stick or other holder for novelty eating purposes.

Another object of this invention is to provide a framework structure which may be used as a much more durable foundation, support, or structure for ice cream or for products which harden, congeal or are frozen from a relatively fluid material into a relatively hardened form. These products may be sold in brick form, or they may be merchandised by attachment to a stick or other holder.

A further object of the present invention is to provide a means whereby the stick or other holder which is used in conjunction with ice cream or other frozen products, may be relatively solidly attached into the ice cream or other frozen material so as to eliminate in a substantial way the possibility for this stick or other holder to detach itself, or to slip out from the frozen product, particularly as the product softens or melts.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In one embodiment of this invention there are used, for example, various ready prepared or precooked cereal products such as corn flakes, wheat flakes, shredded wheat, bran flakes and similar other cereal products or combinations thereof.

These ready-to-eat cereals are bound together into a durable structure by the use of a binding agent, which should have the characteristic of providing a sufficiently durable bond.

In one preferred embodiment of this invention, a flake product, such as corn flakes, may be used. These flakes, by virtue of their more rigid condition, supply a firmer framework, particularly when the product is to be used in conjunction with frozen products for the purpose of reinforcing the framework of the confection.

The flakes that are used should, for best results, be of a relatively heavy flake structure rather than of a thin structure. This will produce increased strength and durability.

Also, preferably, the cereal flakes or the high starch structure pieces that may be used, are preferably toasted or baked so as to crispen or harden them. This not only produces additional strength but also it provides a product which has slower and less water absorption quality. This quality is of importance particularly where the structure is used with frozen materials, or with materials that have an aqueous content, and it is thereby desired not to have the aqueous materials seep into and soften these structure pieces.

Aside from crispening or hardening these materials by baking or toasting them, they may be otherwise dried, or they may even be fried, as in the case of materials such as potato chips, or they may be otherwise hardened in any of the usual procedures.

In another embodiment of this invention, shreds may be used, as for instance shreds such as shredded wheat. Also as a further embodiment, larger flakes, such as potato chips may be used, or dry melba toast, or other dry baked materials may be used. Or, it is possible to use various high starch materials which harden into a sufficiently durable structure in the form of flakes or in forms other than flakes, as for instance, in a lattice form, or in other shapes.

However, as noted herein, for preferred results, these products should be of a relatively hard or dry or crisp nature, and preferably of a relatively thicker nature rather than of a thin frail nature, so as to present a more durable or solid structure, particularly where this invention is to be used as a basis for frozen products or as a basis for any liquid products which congeal upon standing, cooling, etc., as for instance chocolate.

Further, in producing the frame or structure of this embodiment, hard sugar pieces may be used, as for instance in the form of ribbons, or flakes. Or, there may also be used hard fat which has been melted and shaped into the desired flakes or ribbons, or other forms, and then congealed in these required shapes and forms.

Not only a single type or variety of flake or structure piece may be used in the making of the unit structure, but various combinations of structure pieces may be used, as for instance combinations of corn flakes and sugar ribbons, or hard fat flakes and potato chips with or without shred strands, and so forth.

The flakes, or ribbons, or other structure pieces as for instance corn flakes, sugar ribbons, and so forth, that are used in this invention, should for many preferred cases, not be straight, but rather, they should be in a curved or bent or otherwise disjointed or irregular or uneven form or condition so as to provide better anchorage qualities, or better adhesive foundations, or better structural strength, or other characteristics.

Nevertheless, there are some cases where relatively straight pieces of these structure flakes may be used. For instance, it might be desired for this structure to be composed of flakes, the greater part of which are running in one direction, at an angle, so as to support the frozen material within the structure, and so as to form various types of foundations.

Various shapes, and various forms, and various types of structure pieces may be produced so as to meet the specific purposes required. By the use of the structure pieces of various sizes, shapes, and forms, there may be produced various qualities and characteristics in the final unit. For instance, bulky structure pieces may be used for some specific purposes, as, for instance, where it is desired to have a smaller amount of frozen confection within the product. Also, relatively oval, or relatively round, or rounded pieces may be used, for instance, to provide more open space within the unit for the frozen confection than is provided by various types of flat flakes.

With reference to the binders or coating materials of this invention, two different types of binders or coating materials which may be used, although each operates differently and results in different effects, are sugar, and also edible fats. Also, other types of binding materials that may be used, are pectin, powdered skim milk, gelatin, vegetable gums, and similar materials, which, when mixed with proper amounts of aqueous material, produce the required binding or coating material.

The fats that are used should be relatively hard or rigid at room temperature, if the product is not used in conjunction with a frozen product. However, if the product is used in conjunction with a frozen product, it is generally preferred, for nutritional purposes, that the fat should be blended with other oils and/or fats, or should be adjusted so as to be hard or rigid at the chilled temperature. This permits the use of a fat which will melt or soften at body temperature so as to provide superior digestibility, but which, while it is serving the purpose of a coating or binder in the frozen confection will be of a relatively durable nature.

Examples of various fats that may be used in the various embodiments of this invention are olive oil, cottonseed oil, palm kernel stearin, cocoanut oil, cocoanut oil stearin, hydrogenated or naturally hard or plastic oils or fats, or various combinations of these or other types of fats and oils, so as to produce the fatty material of the required melting point or for other characteristics.

The sugar that is used in the embodiments of this invention, particularly for coating and binder purposes, may be of whatever type of sugar that is desired, so as to produce the characteristics required. For instance, where it is desired to increase the strength of the structure, or of the flakes, or other structure pieces, a comparatively hard, or vitreous-like sugar may be used. For example, molten cane sugar, barley sugar, etc., or generally, aqueous solutions of cane sugar, or of other types of sugar in concentrated form, may be used.

These hard or vitreous types of sugar have the advantage that they produce a substantially stronger structure, and they are of a slower dissolving nature so as to be less affected by the aqueous nature of the materials that are impregnated or filled into the unit structure. Of course, however, because of their relatively slower dissolving properties, they dissolve more slowly when placed in the mouth.

In those cases where it is desired to have a structure that will dissolve more rapidly, various non-crystallizable sugars or other types of quick dissolving sugars may be used. For example, sugars of this type may be glucose, honey, levulose, etc., or combinations thereof. Also a quickly dissolving sugar may be formed of a sugar material that is so made, as to be composed of a number of small crystals which are held together and which have many interstices, pores and openings in, or throughout, their crystallized structure.

Also, where desired, glycerine, or similar materials may be added to crystallizable sugars in order to produce water retaining or relatively non-crystallizable properties.

Further, where required, various combinations of sugars, whether of a crystallizable, or non-crystallizable, or other nature, may be mixed and used together in whatever proportions are required, in order to produce various desired characteristics.

In the embodiment of this invention, instead of using binders such as hard fat or sugar, in their natural form, products containing substantial quantities of either one or both of these, or other binder materials may be used.

The binder material, further, may consist of a cereal or starch paste, or it may be of relatively the same substance as the cereal material that is being used in making the structure. For instance, relatively thin strings made from wheat may be bound together with their own adhesiveness, while they are sufficiently soft, and, in a non-compacted form, for instance, this may be used in forming a unit structure, after they have been baked, dried, or otherwise hardened or crispened.

Also, these binding or coating materials may consist of various products, or combinations thereof. For example, a water-in-fat emulsion may be made by the emulsifying together of a sugar syrup in a hard fat, or, a powdered skim milk may be brought to a relatively fluid condition by mixing with an aqueous material, and this product then emulsified with the hard fat. Also, by using liquid oils or various other modifications of the oils, fats, or aqueous materials, an oil-in-water emulsion may be formed to provide required characteristics and to produce various specific results.

Also, where it is desired to give added strength to the flake or other structure pieces and also, so as to give the structure pieces protection against air and moisture, or further protection against moisture of the ice cream or similar material that is impregnated or filled into the unit structure, a hard fat or a similar water repellent material may be used to coat these structure pieces.

This water repellent coating material may further serve as the binding material, where this is desirable, or other materials may be used for the binder. For instance, a hard fat may be used to coat the structure pieces, and then, the structure pieces or flakes may be mixed with the sugar binder or other binder, and these structure pieces compressed or molded together into the required shape.

One particular embodiment of this invention resides in incorporating, within the structure flavoring or food materials of a hygroscopic, powdery nature, or materials which tend to gum or cake when they come into contact with water or water-containing materials. For instance, in mixing the flakes or structure pieces of this invention with powdered milk, which is a hygroscopic material, and then using aqueous sugar syrup as a binder, this aqueous material would affect the hygroscopic nature of the powdered milk, and thereby, this would result in lumping, caking and hardening of these powdered milk particles so as to produce relatively disagreeable qualities in the final product. In the same way, if ice cream or other frozen aqueous material, is mixed into the structure, and thereby allowed to come into direct contact with the powdered milk, or similar hygroscopic materials, the conditions of lumping, caking or hardening would likewise follow.

However, it has now been found, that these hygroscopic materials as for instance, powdered milk, may be incorporated into a molten hard fat or into a similar water repellent material, and in this form they may be applied to the structure pieces. For instance, in the general embodiment of this procedure, the powdered milk and the molten hard fat are mixed together and the powdered milk is dispersed thoroughly in the molten hard fat. This fat-milk mixture is then sprayed, or coated, or otherwise applied to the flakes or structure pieces and is allowed to congeal thereon. These structure pieces are then in a condition whereby the hygroscopic materials will be relatively well protected from aqueous materials, and then, these structure pieces may be bound together with aqueous sugar syrup, or they may be mixed together with aqueous materials such as liquids or ice cream which may congeal thereon.

This coating of a fat or similar water repellent material, aside from providing for a method of applying hygroscopic materials, has many other advantages. For instance, this procedure results in structure pieces remaining crisp and hardened, notwithstanding the fact that aqueous materials are present in the unit.

Also, considerably increased strength is provided in the unit formation and in the formation of the flakes or structure pieces, so that when they are pressed together, they are not broken or crumbled so easily. Also, in handling or consumption, these entire units retain substantially more strength.

Still further by the use of a plastic or hard fat material, particularly if it is applied at a relatively high temperature as for instance from about 200° F. to 210° F., and allowed to remain at this temperature in contact with the food pieces for a period of time, there is a tendency for the fat to seep into the fibers or body of the flake or structure piece, so as to reduce the tendency towards cracking or crumbling of the structure pieces.

The flakes or similar materials which form the unit structure, after they have been mixed or coated, or otherwise combined with the binder material, are then molded or compacted together. It is preferable, if any compression or compacting is used, to compact these structure pieces together rather lightly, so as to result in a product which has a large number of large openings throughout. This is, of course, an important embodiment that is accomplished by this invention, in that it provides a framework for the frozen confection, or similar confection, so as to produce a durable structure to act as the framework, but, at the same time it further provides an even larger amount of space within the unit structure in order to enable as much ice cream or other similar product to be impregnated or filled into the structure.

The flakes, or shreds, or laminations, or other structure pieces that are used in the structure, may have mixed with them, or coated, or otherwise applied or adhered to them, various flavoring or food materials as for instance powdered milk, cinnamon, powdered cream, cocoa, or more solid materials as for instance raisins, or nuts, or various essential oils, or other liquid flavoring materials. The binding material that binds these materials to the structure pieces may or may not be the same binding material that is used to bind the structure pieces together into the unit form. Also, if desired, the finished product, whether in the form of a non-frozen, or non-congealed product, or whether in the form of a frozen confection, may be coated or dipped into chocolate, or it may be covered or sprinkled with other flavoring materials, etc.

In preparing the structure of this invention in conjunction with frozen confections, or in conjunction with materials that are placed within the structure in relatively a liquid condition, and allowed to congeal thereon, the structure is first made by mixing the structure pieces, as for instance the corn flakes, potato chips, etc., with the binder material such as the molten hard fat, or the heavy sugar syrup. The sugar syrup may be heated to about 150° F., for instance, so as to thin it and thereby so as to provide for a thinner and more complete coverage, as for better adhesion at the contact points.

If molten hard fat is used as the binder, it should be allowed to congeal so as to harden, and thereby so as to hold the structure pieces together more durably.

If sugar is used as the binder, the unit structure, after the flakes or structure pieces have been molded together, may or may not be dried, depending upon the nature of the sugar material that is used. Generally, however, it should be dried, because the entire structure should be sufficiently firm so as to retain the required durability for dipping, or for otherwise applying the ice cream or other frozen confection.

The unit structure formations are then dipped into, or are filled with the relatively fluid or plastic material, such as the ice cream mix, and then this material with which it is filled or into which it is dipped, is then frozen or congealed within or on the structure. This procedure of filling or dipping should generally take place while the ice cream or base material is in a substantially fluid condition so as to substantially fill all of the spaces, interstices, and openings that are within the structure formation.

The flakes, shreds, laminations or the other structure pieces that are used in the making of the structure, may be coated with molten hard fat, molten chocolate, molten sugar, or with other similar flavor or food elements, which materials should thereafter congeal on these structure pieces. Thereupon after congelation and hardening of these materials, the liquid ice cream mix, for instance, is filled into the openings and spaces of the structure so as to result in a new and unusual product in which the interior portions contain chocolate laminations, or laminations, etc., of other flavoring materials. The use of these materials in this lamination or coating form, produce further strengthening quality to the unit formation, and also this use produces a new and unusual product from the standpoint of novel confection characteristics.

The general use of the products of this invention is in conjunction with base materials which, it is desired, should be present substantially predominantly. In other words, in the making of an ice cream confection, for instance, it is expected that the ice cream should be the predominant flavor element and that it should be the base material. In view of this, it is therefore desired that the unit structure of this invention should be of a form so as to permit the storage or retention within its own structure form, of substantially large amounts of the fluid or plastic material that is filled therein, and which is afterwards congealed or hardened.

For this reason it is of importance in the embodiment of this invention, where it is desired to provide as much space as possible for the predominant, base material, that the structure pieces which are used to form the basic structure should generally be of a relatively non-bulky form and they should present as little mass as possible. Therefore, products which are bulky, or swelled, or products which contain considerable air space within their own make-up, are generally not desirable.

Aside from the use of the unit structure, as herein described, for the purpose of holding the frozen or congealed material thereon and therein, this structure, in various embodiments, also serves as a means for anchoring and more firmly holding the stick, or other holder within the frozen or hardened piece.

For instance, because of the melting quality of ice cream, and because of the fact that frozen materials develop softness rather quickly after they are taken from the freezer and while they are being consumed, there is a tendency for the stick which holds them, to slip out, before the entire ice cream or other frozen material has been consumed. This results in many obvious inconveniences and disadvantages.

However, by the formation of the unit structure as herein described, it is now possible to provide a frozen confection in which the stick is substantially more firmly and more securely held, and which will remain so, until practically the entire ice cream is consumed.

This is produced by having the stick or other holder firmly cemented or attached into or on the structure by the use of binding materials which may be the same or which may be different than the binding materials that are used to bind the structure pieces together. These binding materials that are used to hold the stick into the structure may be, for instance, molten sugar, or hard fat, or they may be powdered milk, vegetable gums, or pectin, in aqueous pasty form, or they may be combinations of these or other materials.

*Example I*

An example of one embodiment of this invention is to mix 200 grams of dry corn flakes together with 120 grams of glucose of about 40° Baumé, and then to place this in a mold with a stick placed within the unit structure to the extent of about one-third or one-half of the length of this unit structure.

This unit with the stick therein, is then allowed to dry at a temperature of 130° F. for instance, for a period of about 3 hours. Then further drying at room temperature for about 24 hours may take place if necessary.

After this structure has been dried, it is dipped into or otherwise filled with the confection mix which is then congealed therein. In order to get as much of the liquid confection material as possible into the openings of the structure unit, this confection material should be made as liquid or as thin as possible, so that it will permeate throughout the entire unit and fill as many of the spaces as possible. One of the ways by which this may be done, for instance, may be to place the unit structure which is attached to the stick, into a mold and then to pour liquid raspberry ice mix, for instance, over the product, so as to cover it, and then to subject this product to the freezing procedure.

*Example II*

Instead of placing the stick or holder within the structure piece of Example I while the product is being molded, the oblong or square or round unit structure may be dried without the stick. Then, after it is dried, a hole is made within the unit piece and the stick is inserted. Thereupon, a molten hard fat, or a molten sugar, or a pasty mixture of powdered milk and water may be placed in the hole along with the stick so as to cement it to the unit structure. The binding material that is placed into the hole will attach itself to the stick and will also seep onto and around the other flakes or structure pieces, and thereby there will result a substantially firm anchorage of the holder within the confection. Of course, the binding material should be allowed to congeal or harden, after which the stick will be held in a very firm position.

Thereupon, the unit structure is filled or impregnated with the material which is then frozen or congealed therein.

*Example III*

There may be combined 80 grams of flakes or similar structure pieces, and 70 grams of hard vegetable fat of 115° F. melting point. The fat is melted and heated to 200° F. At this point the flakes are added into the molten fat and are mixed thoroughly therein in order to thoroughly coat these structure pieces.

This mixture is then placed into molds and some pressure is applied if this is desired. The product is then placed into a temperature of 50° F. in order that the fat may congeal and bind the flakes together.

After congelation has taken place, the unit structure may be filled with the liquid confection mix which is then hardened or frozen therein. Various flavoring materials, if desired, may be mixed with the molten hard fat, prior to the mixture with the flakes.

*Example IV*

There may be mixed together 70 grams of granulated cane sugar and 25 grams of water. This is heated to about 160° F., or until it becomes a syrup.

This syrup is cooled so that it will not substantially soften the flakes when it is mixed therewith. This syrup is then mixed with 50 grams of the flakes or similar structure pieces so as to thoroughly coat all of the flakes.

This combined product is then molded and slightly compacted, if desired. The product then is placed at a temperature of 135° F. for about 4 or 5 hours in order to dry. After this, the product may have an air drying at room temperature for about 24 hours.

The cane sugar may have cinnamon, vanilla, or other flavoring materials contained therein, or a combination of liquid hard fat and chocolate powder, for instance, may be sprinkled over the unit structure.

A stick or holder may be placed within this structure as herein described. Dipping, coating, freezing, or other required procedures may follow.

Example V

There is mixed together 10 grams of powdered skim milk with 35 grams of hardened vegetable oil of 115° F. melting point. This mixture takes place by heating the hard fat to a temperature of 180° F. so as to melt it, and then mixing the powdered milk very thoroughly therein. At this point 50 grams of the flakes, for instance, are mixed into this fat combination and the product is completed as described in Example III above.

The stick or holder may be placed and fastened by adhesion within the unit structure after the structure is completed. Or, a piece of spear-shaped hard candy, which has first been attached to the stick in lollipop form, is imbedded into the flake-fat-milk combination while it is being molded.

In the embodiment of this invention, the unit structure to which is attached the stick or holder, need not be of relatively the same size as the entire frozen or hardened piece so as to be present in substantially the entire hardened piece. Instead, the unit structure may be of sufficient size to be included within only about one-third, or one-half, or within even smaller parts of the frozen piece. In this way, the structure which has been reduced in size, will serve as a firm base or foundation for the stick, but will provide even greater space for the ice cream or other frozen confection that is used therewith. In cases such as this the structure may be in the form of a horizontal strip or block, or, it may be vertical, or it may be in the form of an angle joined at the stick, or it may be in the form of a cross, or a circle, or in various other shapes or forms so as to provide various characteristics, as for instance a more durable foundation for the hardened confection.

In a still further embodiment of this invention, the stick may first be made so as to have, at the end thereof, a piece of candy, and particularly a piece of hard candy, as for instance, in the form of a lollipop. This may then be placed into the flakes or structure pieces, while they are being molded, for instance, and in this way, the candy piece will serve as a means by which the stick may be held more firmly within the unit structure.

If desired, the candy piece may be covered with hardened fat when it is placed within the structure piece, and then later, the entire unit structure may be heated above the temperature of the hard fat so that the hard fat will soften. Then, thereafter, the fat is allowed to congeal by placing the entire unit piece into a cooler, or it may be further hardened by the ice cream or other frozen material which is then frozen therein, or by various other methods. This will result in the hard fat becoming soft or liquid at the warmer temperature so as to form an adhesion agent between the candy piece and the structure pieces, so as to secure a firm adhesion upon cooling.

Also, other binding agents may be used in place of the hard fat. However, with other types of binders, drying or heating may be necessary to have the candy adhere, rather than a cooling procedure, as in the case of fat.

Likewise, this procedure may be used even when there is no candy on the stick, in which case, a sufficient amount of the binder may be applied to the stick, so that when it is placed within the structure, and this binder is then softened sufficiently, and then hardened or congealed, there will be produced a product in which the stick is firmly cemented to the structure pieces, and thereby becomes well founded in the entire structure.

In various cases, also, the candy at the end of the stick may be spear-shaped or further shaped so that the candy will form an obstruction so as to further increase the hold or grip that it has within the structure unit.

The candy material which is attached to the stick, may be not in just one piece, but it may be in ribbon form, particularly as curved ribbons, or it may be in the form of bent or curved flakes for instance, or it may be in various other forms so as to more rigidly hold the stick on to the unit structure and thereby so as to hold it securely within the ice cream or similar block. Also, in some cases, the hard candy ribbons may take the place of straight ribbons or flakes which are fastened or melted on to the stick, and which are placed in a position horizontal to the stick.

In order to facilitate the entrance of the liquid or plastic frozen confection into the interstices and spaces in the unit structure, and so as to fill these spaces as much as possible, it is desirable in many cases to evacuate the air from these spaces by such methods, as for instance, drawing the liquid confection into these spaces by vacuum. In a process such as this, the air may be evacuated from between these spaces, and then the vacuum continued, in order to draw the liquid material therein.

Also, with reference to the stick or holder that is used in these confections, this stick may be of the usual type, such as a heavy rope material, or a wooden stick, and so forth. In some cases, where desired, the entire stick, including the holder, may be of an edible material so that it all may be consumed. Also, it is possible to have all, or part of the unit structure within the frozen confection baked on the stick so as to provide a strong adhesion to the stick. Various other combinations of the methods herein described may be used with reference to the holder for the frozen confection, or with reference to its adhesion to the unit structure therein.

In the accompanying drawing are shown diagrammatically some of the embodiments of the present invention to which the present invention is by no means restricted, the illustrations upon the accompanying drawing merely being exemplary and not limiting.

Figures 1, 2, and 3 are longitudinal sectional views of three different forms of frozen confections upon handle members, which may be utilized according to the present invention.

Figures 4 and 5 are enlarged views showing a form of coating and surfacing of the structure pieces and the manner of their attachment to the stick.

Figure 6 is a further longitudinal sectional view showing an alternative form illustrating the method by which the stick may be locked in the frozen confection construction.

Referring to Figure 1 the skeleton framework may be formed of a plurality of dried, crisp food flakes or chips 10, and which for example may be corn flakes, rice flakes, potato flakes, or various other dried, toasted, roasted or prepared food products, preferably in flake form. These flakes may be covered with hard fat or with sugar or with other suitable binder materials 11 and then molded or formed with or without the stick 14. Each of the flakes 10 in this illustration is provided with a coating 11 and in the embodiment shown, the stick 14 is afterwards inserted and caused to hold itself in position by an edible cement 15 which, for example, may be powdered milk made into an aqueous paste, or a hard fat, or even a sugar syrup.

After the product has thus been formed, the interstices or recesses between the flakes 10 may be filled with a liquid material 12 such as liquid ice cream mixture, which may then be frozen in position to substantially fill all of said recesses following which the entire article may be coated with chocolate, as designated at 13.

The structure of Figure 1 will not readily fall away from the stick, nor will the ice cream readily fall off the stick or drip upon the person eating it. The flakes tend to form an insulating casing for the ice cream. When the air is evacuated from the framework before filling it with ice cream, the ice cream will keep better and apparently will retain its desired flavor for a longer period of time.

The stick 14 may, if desired, be made of wood or rope or some suitable edible or inedible material.

In Figure 2 the framework or skeleton is made up of a series of flakes or other structure pieces 16 which may be connected together by a sugar or fat coating 17, for instance.

The stick 18 may be of the same material as the enlargements 19, and this entire stick may either be of wood or of other similar materials, or it may be of an edible baked or toasted product. Still further, the enlargements together with the major portion of the stick within the confection may be of the hard, crisp food material, and may be baked on the wood stick. These enlargements which are firmly held within the unit structure comprising flakes or other structure pieces, enable substantially increased retention of the stick within the frozen confection. The liquid confection mix 20 may then be filled within the open spaces of the flakes, and frozen therein.

If desired, the flakes of Figure 2 may be eliminated entirely in which event the enlargements 19 will serve to more firmly hold the stick within the confection, although not as well as when the flakes are present. Also, the stick may be a regular wooden stick or other holder which is firmly joined to the enlargements 19 by adhesion with hard fat, sugar syrup, or by being baked thereon.

In the embodiment of Figure 2, the stick may be molded in position with the structure pieces, while these structure pieces are being molded together. The enlargements 19 will then be held firmly in position and will join firmly with the adhesive coating 17.

In the embodiment of Figure 3 a dough or cereal product 21 may be baked on the stick 22. This will provide the grille or latticework formation 21, attached to the stick 22. The frozen confection 23 is then placed therein and frozen within and over this grille formation.

In Figure 4 is shown the enlargement of a portion of one embodiment illustrating the attachment of the flakes 10 to the stick 14. It will be noted by reference to Figure 4 that the adhesive coating 11 whether sugar or fat or a combination thereof extends substantially continuously over the flakes 10 and also over the wall of the stick 14 so that there is a permanent and satisfactory junction.

In Figure 5 is shown an internal construction similar to that of Figure 4 in which, however, the flakes 26 are coated with hard fat 27 which carries a hygroscopic powdered material 28.

As shown in Figure 5, the flakes 26 are provided with a fat coating 27, carrying the hygroscopic powdery material 28. For example, this may be powdered milk. The sugar binder 29 extends over the fat coating and also over the stick 25 to form a substantially continuous binding.

In Figure 6 is again shown another embodiment in which the solid piece structure 35, has molded therein or rigidly attached thereto a stick 36. This structure 35 will lock the stick 36 in position so that it cannot be readily moved from the flake structure made of the flakes 37 bound by the binder material 38, through which flakes is interspersed the frozen confection 39.

The structure 35 may be made of a hard candy or of sugar, or of a crisp, baked product and it will assure a firm junction and union of the stick 36 with the flake structure, so as to desirably hold the stick within the frozen confection.

What I claim is:

1. A frozen confection having extended thereinto a hand holder member, said hand holder member being anchored within said frozen confection by attachment to a structure which is contained at least within a portion of the frozen confection, said structure comprising a plurality of substantially rigid food pieces bound together by an edible adhesive material, said structure having intercommunicating recesses extending throughout, and said intercommunicating recesses being substantially filled with the frozen confection.

2. A frozen confection having contained therein a structure formed of a plurality of substantially rigid food pieces bound together by an edible adhesive material, said structure having intercommunicating recesses therein, and said intercommunicating recesses being substantially filled with the frozen confection.

3. A frozen confection having contained therein a structure formed of a plurality of substantially rigid food pieces bound together by an edible adhesive material, said structure having intercommunicating recesses therein, and said intercommunicating recesses being substantially filled with a frozen material, said food pieces being substantially coated with a fatty water repellent material.

4. A frozen confection having contained therein a structure formed of a plurality of substantially rigid food pieces bound together by an edible adhesive material, said structure having intercommunicating recesses therein, said intercommunicating recesses being substantially filled with a frozen material, and said food pieces having coated thereon a water repellent material, said water repellent material being a fat, and said fat containing therein and substantially encompassing a material that tends to cake upon contact with water.

5. A frozen confection having contained therein a structure formed of a plurality of substantially rigid food pieces bound together by an edible adhesive material, said structure having intercommunicating recesses therein, said intercommunicating recesses being substantially filled with the frozen confection, and said food pieces containing thereon a fat material as the bonding or coating material, said fat material being relatively soft at body temperature so as to facilitate the digestion thereof, but being relatively hard at the chilled temperature of the frozen material so as to have substantially good coating and binding quality.

6. A frozen confection having extended thereinto a hand holder member, said hand holder member being anchored within said frozen confection by attachment to a structure which is contained at least within a portion of the frozen confection, said structure comprising a plurality of substantially rigid food pieces bound together by an edible adhesive material, said structure having intercommunicating recesses extending therein, said intercommunicating recesses being substantially filled with the frozen confection, and said hand holder member having an obstruction thereon, said obstruction tapering out of the hand holder member and into portions of the structure so as to more firmly hold and retain said hand holder member within the frozen confection.

7. A process of making a frozen confection, said process comprising providing a plurality of relatively rigid food pieces, binding them together with an edible adhesive binder so as to leave communicating recesses substantially between them, and then providing a hand holder member to extend into this structure, providing additional binding material on the portion of the hand holder member that is extended into the structure, and then filling the interstices between the food pieces with the frozen confection in its relatively liquid form, and then providing for the containing of the structure of the bound food pieces within the frozen confection, and then freezing so as to result in the frozen confection being in a frozen condition within the interstices of the structure as well as on the outside of the structure.

8. The frozen confection of claim 2, the edible adhesive material being a hard fat.

9. The frozen confection of claim 2, the edible adhesive material being a hard sugar.

10. The frozen confection of claim 2, the rigid food pieces being crisp cereal flakes.

11. The frozen confection of claim 2, the rigid food pieces being sugar flakes.

12. The frozen confection of claim 2, the rigid food pieces being corn flakes.

13. The frozen confection of claim 2, the frozen confection being ice cream.

14. The frozen confection of claim 4, the material tending to cake upon contact with water being powdered milk.

ALBERT MUSHER.